US007853821B2

(12) United States Patent
Knapstad et al.

(10) Patent No.: US 7,853,821 B2
(45) Date of Patent: Dec. 14, 2010

(54) IDENTIFYING ONE OR MORE STORAGE DEVICES CAUSING A FAILURE CONDITION DURING DISCOVERY OF STORAGE DEVICES

(75) Inventors: Jonathon C. Knapstad, Meridian, ID (US); Andrew H. Dallman, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1029 days.

(21) Appl. No.: 11/432,258

(22) Filed: May 11, 2006

(65) Prior Publication Data
US 2007/0260915 A1 Nov. 8, 2007

Related U.S. Application Data

(60) Provisional application No. 60/792,786, filed on Apr. 17, 2006.

(51) Int. Cl.
*G06F 11/00* (2006.01)
(52) U.S. Cl. .................... 714/5; 714/25; 714/48; 714/704; 709/213
(58) Field of Classification Search .............. 714/48, 714/704, 4, 23
See application file for complete search history.

(56) References Cited

U.S. PATENT DOCUMENTS

| | | | | |
|---|---|---|---|---|
| 4,811,279 A * | 3/1989 | Bean et al. | ............... | 710/305 |
| 5,864,653 A * | 1/1999 | Tavallaei et al. | ............ | 714/2 |
| 5,948,075 A * | 9/1999 | Osten | ............... | 710/8 |
| 6,199,112 B1 | 3/2001 | Wilson | | |
| 6,463,550 B1 * | 10/2002 | Cepulis et al. | ............ | 714/25 |
| 6,795,934 B2 * | 9/2004 | Nagata et al. | ............ | 714/8 |
| 7,085,958 B2 * | 8/2006 | El-Batal | ............... | 714/8 |
| 7,246,262 B2 * | 7/2007 | Nagata et al. | ............ | 714/8 |
| 7,464,291 B2 * | 12/2008 | Nagata et al. | ............ | 714/8 |
| 2003/0005367 A1 * | 1/2003 | Lam | ............... | 714/42 |
| 2003/0046602 A1 * | 3/2003 | Hino et al. | ............... | 714/4 |
| 2003/0172123 A1 * | 9/2003 | Polan et al. | ............ | 709/213 |
| 2004/0042408 A1 * | 3/2004 | Sakai | ............... | 370/241 |
| 2004/0117438 A1 * | 6/2004 | Considine et al. | ......... | 709/203 |
| 2005/0010843 A1 * | 1/2005 | Iwamitsu et al. | ........ | 714/724 |
| 2005/0223266 A1 * | 10/2005 | Iwamitsu et al. | ............ | 714/5 |
| 2005/0278581 A1 * | 12/2005 | Jiang et al. | ............ | 714/40 |
| 2006/0041783 A1 | 2/2006 | Rabinovitz | | |
| 2006/0080318 A1 | 4/2006 | Huston et al. | | |
| 2006/0112304 A1 * | 5/2006 | Subramanian et al. | ..... | 714/6 |
| 2007/0067586 A1 * | 3/2007 | Mikami | ............... | 711/162 |

OTHER PUBLICATIONS nStor & Intel, "SCSI Accessed Fault-Tolertan Enclosures", Apr. 1997, R041497, p. 1-38.*
Talagala, "An analysis of error behavior in a large storage system", Jan. 1999, UC at Barkley, p. 1-17.*
HP Storage Works 4000/6000/8000 Enterprise Virtual Array release notes, pp. 1-15 (Jun. 2005) (This Product Release Incorporated an Implementation of the Invention).
HP Storage Works Enterprise Virtual Array 3000/5000 release notes (VCS 3.028), pp. 1-12 (Dec. 2005) (This Product Release Incorporated an Implementation of the Invention).
HP Storage Works 4000/6000/8000 Enterprise Virtual Array release notes (XCS 5.030), pp. 1-14 (Oct. 2005) (This Product Release Incorporated an Implementation of the Invention).

* cited by examiner

*Primary Examiner*—Robert Beausoliel
*Assistant Examiner*—Jeison C Arcos

(57) ABSTRACT

A failure condition caused during discovery of storage devices on a storage network having at least one primary bus interconnecting the storage devices is detected. In response to detecting the failure condition, interaction is performed with the storage devices over a secondary bus separate from the primary bus to identify and disable one or more of the storage devices causing the failure condition.

18 Claims, 2 Drawing Sheets

IDENTIFYING ONE OR MORE STORAGE DEVICES CAUSING A FAILURE CONDITION DURING DISCOVERY OF STORAGE DEVICES

CROSS REFERENCE TO RELATED APPLICATION

This claims the benefit under 35 U.S.C. §119(e) of U.S. Provisional Application Ser. No. 60/792,786, entitled "Removing Devices That Inhibit Discovery of Other Devices on a Communications Link," filed Apr. 17, 2006, which is hereby incorporated by reference.

BACKGROUND

A storage area network (SAN) is used to attach storage devices (e.g., storage controllers, tape libraries, disk array systems, and so forth) to other computers, such as application servers, backup servers, user computers, and so forth. One widely used SAN technology is the Fibre Channel (FC) networking technology. Various types of Fibre Channel topologies can be used, including point-to-point topologies, cross-point switch (or fabric) topologies, or arbitrated loop topologies.

When a storage area network first starts up (or when the storage area network resets for whatever reason), one of the tasks performed by one or more controllers (and SAN switches) in the storage area network is the discovery of storage devices that are attached to the storage area network. In some cases, one or more malfunctioning storage devices can prevent the device discovery process from completing. For example, during a discovery procedure in a storage area network, a storage device can repeatedly send a command to re-initialize the storage area network, which would restart the device discovery procedure. After several restarts, a controller may decide to disable an entire bus in the storage area network. If all buses to a particular storage device (or multiple storage devices) are disabled (failed), then the data contained in that particular storage device (or storage devices) will not be accessible.

BRIEF DESCRIPTION OF THE DRAWINGS

Some embodiments of the invention are described with respect to the following figures.

DETAILED DESCRIPTION

Figure 1:
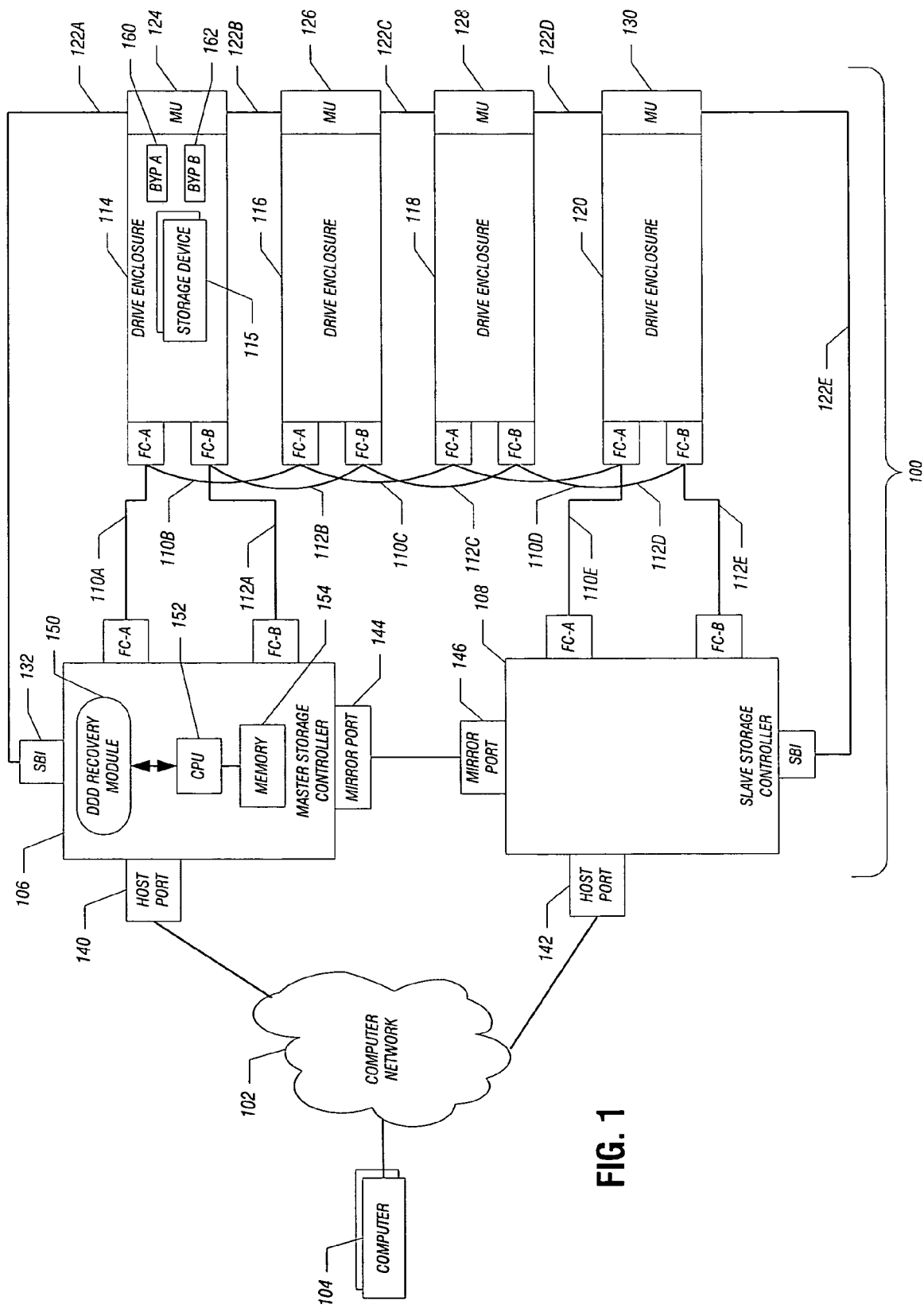
FIG. 1 is a block diagram of an example arrangement of a storage area network that incorporates an embodiment of the invention.

FIG. 1 is a block diagram of an example arrangement that includes a storage area network 100 that is coupled to a computer network 102, such as a local area network (LAN), wide area network (WAN), or a public network such as the Internet. The computer network 102 is connected to one or more computers 104. Examples of the computers 104 include backup servers, application servers, and other types of computers (including user computers).

The storage area network 100 includes a first storage controller 106 (which in the example embodiment depicted in FIG. 1 is identified as a master storage controller). The storage area network 100 also includes a slave storage controller 108. In other implementations, the slave storage controller 108 can be omitted, with only one storage controller used. In yet other implementations, more than two storage controllers can be used.

The storage area network 100 includes two types of buses: primary buses and a secondary or recovery bus. In the storage area network 100 of FIG. 1, two primary buses are employed: a first primary bus 110 (including primary bus segments 110A, 110B, 110C, 110D, and 110E) and a second primary bus 112 (including primary bus segments 112A, 112B, 112C, 112D, and 112E). In one example implementation, each of the primary buses 100 and 112 are Fibre Channel (FC) buses. In other embodiments, other types of buses can be used.

The term "bus" refers to a communications link (which can be made up of one segment or multiple segments) over which data between nodes can be communicated. In the example arrangement of FIG. 1, each Fibre Channel primary bus 110, 112 is arranged in an arbitrated loop topology. An arbitrated loop refers to a shared communications link (shared by storage devices on the bus). In an arbitrated loop, storage devices have to arbitrate for access to the bus before the storage devices can initiate transactions over the bus. In another implementation, each bus 110, 112 can have other topologies, e.g., point-to-point topology, fabric topology, etc.

The first primary bus 110 includes a first segment 110A between the storage controller 106 and a drive enclosure 114, a second segment 110B between the drive enclosure 114 and a drive enclosure 116, a third segment 110C between the drive enclosure 116 and a drive enclosure 118, a fourth segment 110D between the drive enclosure 118 and a drive enclosure 120, and a fifth segment 110E between the drive enclosure 120 and the storage controller 108. Note that the number of drive enclosures and corresponding segments between the drive enclosures depicted in FIG. 1 is provided for purposes of example, as other implementations can employ a smaller number or larger number of drive enclosures. Each drive enclosure represents a subsystem or group of one or more storage drives 115 (e.g., tape drives, disk drives, and so forth).

Similarly, the second primary bus 112 includes segments 112A, 112B, 112C, 112D, and 112E. The second primary bus 112 is provided for purposes of redundancy (in case of failure of the first primary bus 110). In alternative embodiments, one primary bus instead of two primary buses can be used. In yet another implementation, more than two primary buses can be used.

The primary buses 110, 112 are used for communicating actual traffic between the drive enclosures and the storage controllers. In other words, the storage controllers 106, 108 are able to perform read and/or write operations with respect to any of the drive enclosures 114-120. A read operation involves a storage controller issuing a read request to a target storage device, and receiving read data from the target storage device. A write operation involves a storage controller issuing a write request (along with write data) to a target storage device to write the data into the target storage device. The read/write requests and read/write data are communicated over a primary bus 110 or 112.

In addition to the primary buses 110 and 112, a secondary (or recovery) bus 122 is provided in the storage area network 100. The secondary bus 122 also includes multiple segments 122A, 122B, 122C, 122D, and 122E interconnecting respective pairs of the storage controllers 106, 108 and drive enclosures 114, 116, 118, and 120 (as depicted). In one example implementation, the secondary bus 122 is a car area network (CAN). In other implementations, the secondary bus 122 is another type of network.

The drive enclosures 114, 116, 118, and 120 include corresponding monitoring units (MUs) 124, 126, 128, and 130. The monitoring units are connected to respective secondary bus segments. A first segment 122A of the secondary bus 122 is connected between a secondary bus interface (SBI) 132 of the master storage controller 106 and the monitoring unit 124 of the drive enclosure 114. Similarly, segment 122B is connected between monitoring units 124 and 126, segment 122C is connected between monitoring units 126 and 128, segment 122D is connected between monitoring units 128 and 130, and segment 122E is connected between monitoring unit 130 and a secondary bus interface 134 of the slave storage controller 108.

In general, each of the monitoring units 124-130 is used to perform various maintenance tasks, such as to allow the storage controllers 106, 108 to monitor for heartbeat indications from respective drive enclosures, and other maintenance tasks. A heartbeat indication is issued by a drive enclosure (or by a storage device in the drive enclosure) to allow the storage controller to determine that the drive enclosure (or storage controller) is still present and active.

In accordance with some embodiments, the monitoring units associated with the drive enclosures also enable a storage controller (either 106 or 108) to automatically identify and disable storage devices (in one or more of the drive enclosures) that cause a failure condition in the storage area network 100 during a device discovery procedure. A storage device that causes a failure condition in the storage area network 100 is referred to as a "failed" or "malfunctioning" storage device. More specifically, a storage device that inhibits successful completion of a discovery procedure is referred to as a "device discovery disrupter (DDD) storage device." The failure condition caused by the DDD storage device is a DDD failure condition.

Storage device discovery refers to a procedure during which a controller successively polls (e.g., perform port and process logins of) storage devices on a bus to solicit responses from the storage devices to discover the presence of the storage devices. The ability to automatically identify and disable failed storage devices (without external or manual intervention) improves on prior conventional techniques in which system administrators have to manually go through a log or perform some other manual procedure to identify which storage device has failed.

Typically, during a discovery procedure, disruptive storage devices may prevent or delay successful completion of the discovery procedure. The ability to identify a specific storage device that causes a failure condition (the DDD storage device) allows for the DDD storage device to be removed so that the remaining devices can complete the discovery procedure. In accordance with some embodiments, the ability to identify and disable (remove) DDD storage devices can be performed in a relatively quick manner so that time savings can be achieved, particularly since a storage controller does not have to waste a large amount of time dealing with the DDD storage devices.

In some implementations, a device discovery procedure is a multi-phase procedure that includes: initializing buses used for communications with storage devices; detecting presence of storage devices on each bus; performing handshaking protocols with storage devices on a bus; issuing commands to retrieve information about the devices; configuring storage devices for appropriate use in a storage array; reading information from a storage device to determine which storage array the device is part of and whether the device contains metadata about the storage array that the device is part of; and using information collected to determine viability of a storage array. In other implementations, a discovery procedure can involve other and/or additional tasks.

A storage device exhibiting malfunctioning behavior typically causes one or more resets of the primary bus, which interrupts the discovery procedure. The disruptive device or a neighboring device typically reacts to the malfunctioning behavior by requesting a bus reset. In FC-AL implementations, devices do this by issuing a LIP (loop initialization primitive). The LIPs force the storage controller to re-perform initialization (which results in restarting the device discovery procedure). This behavior effectively inhibits or delays (disrupts) the successful completion of the device discovery procedure.

As depicted in FIG. 1, the first primary bus segments are connected between FC-A ports of corresponding storage controllers (106, 108) and drive enclosures (114, 116, 118, 120). FC stands for Fibre Channel and FC-A refers to ports on respective storage controllers and drive enclosures associated with the first primary bus 110. The FC-B ports of the storage controllers and drive enclosures correspond to the second primary bus 112.

The storage controllers 106, 108 also have host ports 140, 142, respectively, for connecting the storage controllers 106, 108 to the computer network 102. In addition, the storage controllers 106, 108 include respective mirror ports 144, 146 to enable inter-communication between the storage controllers 106, 108 for coordination purposes between the master and slave storage controllers.

The master storage controller 106 includes a DDD recovery module 150 (which can be a software module or a hardware module) that identifies and disables DDD storage devices during a device discovery procedure. The DDD recovery module 150 is executable on a central processing unit (CPU 152), or multiple CPUs, in the storage controller 106. The CPU 152 is coupled to a memory 154. The slave storage controller 108 also includes a DDD recovery module, CPU(s), and memory similar to the components in the master storage controller 106.

Figure 2:
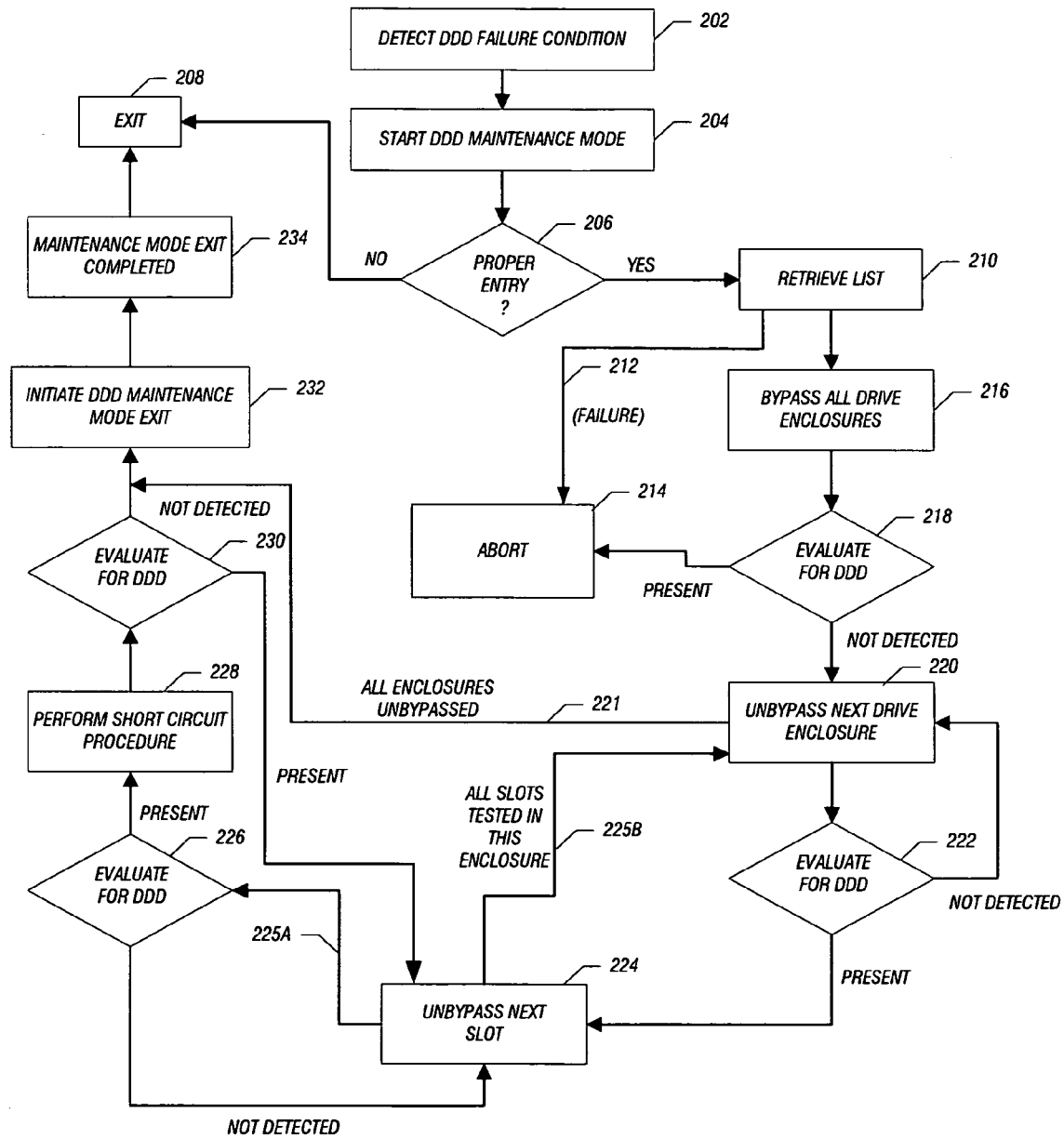
FIG. 2 is a flow diagram of a process of identifying and disabling one or more storage devices causing failure condition(s) in the storage area network, in accordance with an embodiment.

As depicted in FIG. 2, the DDD recovery procedure according to some embodiments is initiated upon detection (at 202) of a failure condition, where the failure condition (according to one embodiment) includes both the first and second primary buses 110, 112 have been failed due to device discovery disruptor (DDD) behavior. This failure condition is referred to as a DDD failure condition. Because the first and second primary buses have failed, the storage devices of the storage area network 100 are no longer visible to the storage controllers 106, 108 over the primary buses. However, the drive enclosure monitoring units remain visible to the storage controllers over the secondary bus 122.

The DDD recovery procedure is performed by the DDD recovery module 150 (FIG. 1) in the master or slave storage controller 106, 108. When a storage controller (106, 108) detects DDD behavior by one or plural storage devices, then the storage controller (106, 108) will fail one or both of the first and second primary buses, causing the DDD failure condition. In some embodiments, failure of both the first and second primary buses will trigger the DDD recovery procedure. In other embodiments, failure of just one of the primary buses can trigger the DDD recovery procedure. In yet other embodiments, the DDD failure condition can be indicated upon detection of DDD behavior by any storage device (with or without the primary buses being failed).

In performing the recovery procedure, the secondary bus 122 is used for communications between the storage controller (106, 108) and the monitoring units (124, 126, 128, 130) in the drive enclosures 114, 116, 118, and 120. For example, the storage controller 106, 108 communicates over the secondary bus 122 to request various bypass operations (in which entire drive enclosures are bypassed or individual storage devices are bypassed) during the recovery procedure. Bypass operations are discussed in greater detail further below.

In this manner, the storage controller 106 or 108 interacts with storage devices (through the monitoring units) over the secondary bus 122. Interaction between a storage controller and storage devices over the secondary bus refers to the storage controller issuing commands (or requests) over the secondary bus that causes some action with respect to the storage devices (such as removing the storage devices from a primary bus), and the storage controller detecting whether some condition (such as a failure condition) is still present after such action has been performed.

In one embodiment, the recovery procedure is managed by the master storage controller 106. In other embodiments, both the master and slave storage controllers 106, 108 can be involved in the recovery procedure. In the ensuing discussion, reference is made to the master controller 106 performing the various tasks of the recovery procedure. However, it is noted that the same tasks can alternatively be performed by the slave storage controller 108.

Upon detection of the failure condition that triggers the recovery procedure, the master storage controller starts (at 204) DDD maintenance mode. In the embodiment of FIG. 2, the recovery procedure is performed in DDD maintenance mode. However, in other embodiments, the recovery procedure does not have to be performed as part of a maintenance mode.

In starting the DDD maintenance mode, the master and slave storage controllers communicate with each other, with the master storage controller informing the slave storage controller that a recovery procedure is starting. Also, the master storage controller asks the slave storage controller whether the slave storage controller also perceived the DDD failure condition.

The master storage controller next determines (at 206) whether there has been proper entry into the DDD maintenance mode. Entry into the DDD maintenance mode is improper if the master storage controller receives an indication from the slave storage controller that the slave storage controller did not see the same failure condition as the master storage controller. In this scenario, it is likely that some component (software or hardware component) in the master storage controller caused the detection of the DDD failure condition on the first and second primary buses. In this case, instead of performing the recovery procedure, an alternate procedure is performed (such as designating the slave storage controller 208 the master and disabling the master storage controller). If improper entry into the DDD maintenance mode is detected at 206, then the recovery procedure exits (at 208) to effectively abort the recovery procedure.

However, if the entry into the DDD maintenance mode is proper, the master storage controller 206 next retrieves (at 210), over the secondary bus 122, a list of the drive enclosures that are in the storage area network 100. If the master storage controller 206 is unable to obtain this list of drive enclosures, then that constitutes a failure (212) in the recovery procedure, which causes abort (at 214) of the DDD recovery procedure.

However, if the master storage controller 206 is able to retrieve the list of the device enclosures, then the master storage controller begins the DDD recovery procedure by evaluating each of the drive enclosures in the list individually to identify which one or more drive enclosures contain(s) devices causing discovery disruption. In one embodiment, the master storage controller starts with the highest drive enclosure number down to the lowest. In other embodiments, other sequences can be used, such as lowest to highest or some random sequence.

The master storage controller 206 first bypasses (at 216) all drive enclosures. In some embodiments, bypassing a storage device entails the storage controller sending a bypass command over the secondary bus 122 to the corresponding monitoring unit (one of monitoring units 124-130) associated with the drive enclosure in which the storage device to be bypassed is located. In response to the bypass command, the monitoring unit signals an appropriate one (or both) of the bypass devices 160 and 162 in the drive enclosure (depicted as being part of drive enclosure 114 in FIG. 1). Similar bypass devices are in the other drive enclosures. The signaled bypass device(s) 160 and 162 will cause the selected storage device to be removed (or disconnected or isolated) from the primary bus (110 or 112).

In some implementations, the storage devices in a drive enclosure are provided in slots of the drive enclosure. Each bypass command includes a first mask and a second mask (corresponding to the first primary bus and second primary bus, respectively). Each mask has bits indicating which slots are to be removed from the respective primary bus. The monitoring unit processes the first and second masks in a bypass command, and signals the appropriate one(s) of the bypass devices 160 and 162 to remove selected slots (slots associated with bits in the masks indicating that the slots should be removed) from the primary bus.

To bypass an entire drive enclosure from a primary bus, the mask for that bus will have all bits set to the state indicating that all slots of the drive enclosure are to be removed from the bus. To unbypass a storage device (or drive enclosure), then a bypass command is issued with the mask bits set to another state to indicate that the respective slot(s) is (are) to be connected back to the primary bus.

Next, after all drive enclosures have been bypassed, the master storage controller evaluates (at 218) whether the DDD failure condition is still present. If the DDD failure condition is still present (or if a time-out has occurred) even after all drive enclosures have been bypassed, then that is an indication that the device discovery disruption was not caused by any of the storage devices in the drive enclosures, but rather by some other condition. Therefore, the DDD recovery procedure can be aborted (at 214). The abort unbypasses all storage devices in the drive enclosures.

If the DDD failure condition disappears after all drive enclosures have been bypassed, as determined as 218, the master storage controller unbypasses (at 220) the next drive enclosure in the sequence. With the next drive enclosure unbypassed, the master storage controller then evaluates (at 222) whether the DDD failure condition is present. If not, then the next drive enclosure can be unbypassed (at 220), and the evaluation at 222 is repeated. If all drive enclosures have been unbypassed and no DDD failure condition is detected, then that is an indication that there is no DDD failure condition, in which case the master storage controller follows control path 221 to initiate (at 232) DDD maintenance mode exit.

However, if unbypassing the next drive enclosure caused the DDD failure condition to be present, as detected at 222, then that particular drive enclosure is identified as containing a disruptive storage device, and the recovery procedure proceeds to perform a sequential search through all the storage devices of such drive enclosure to identify one or more storage devices in the drive enclosure that caused device discovery disruption. In one implementation, the master storage controller sequences from the highest slot number to the lowest slot number in the drive enclosure. In other implementations, other slot sequences can be used.

To process the identified drive enclosure that caused the DDD failure condition, the master storage controller unbypasses (at 224) the next slot. Note that the first time that act 224 is performed, all slots of the drive enclosure are bypassed, so that slots can be unbypassed sequentially as noted above. After unbypassing the next slot, the master storage controller follows control path 225A and evaluates (at 226) for a DDD failure condition. If this DDD failure condition is not detected, then the next slot is unbypassed (at 224), and the evaluation at 226 is repeated. If all slots have been unbypassed and no DDD failure condition is detected, then that indicates that the presently processed drive enclosure does not contain any storage device that caused the DDD failure condition, in which case the master storage controller follows control path 225B to unbypass (220) the next drive enclosure.

However, if the DDD failure condition is detected after unbypassing the next slot, then a disruptive storage device has been identified. Next, the master storage controller performs (at 228) a short circuit procedure in which the storage device causing the device discovery disruption condition is bypassed and all remaining storage devices in the drive enclosure are unbypassed. Unbypassing all remaining storage devices is effectively a shortcut to determine whether the remaining storage devices are error-free. If that is the case, then the test time for the DDD recovery procedure can be reduced by not having to sequentially process each of the remaining storage devices one at a time.

After the short circuit procedure is performed at 228, the master storage controller evaluates (at 230) for the DDD failure condition. If the DDD failure condition is no longer present, then the identification of failed storage device(s) has been completed and the master storage controller initiates (at 232) DDD maintenance mode exit. When the DDD maintenance mode exit is completed (at 234), the recovery procedure can exit (at 208).

If the evaluation performed at 230 indicates that the DDD failure condition has returned upon unbypassing remaining storage devices at 228, the procedure returns to 224, where all untested devices in the remaining enclosures are again bypassed. The next slot is then unbypassed to continue the search for the next malfunctioning storage device in the device enclosure. The tasks at 226, 228, and 230 are then repeated.

The result of the recovery procedure described above is that any storage device(s) that exhibit(s) DDD behavior is automatically identified and disabled by the DDD recovery module 150 in the master and/or slave storage controller, without manual user intervention. A storage device exhibiting DDD behavior is disabled by removing the storage device from the first and/or second primary bus.

In some embodiments, during the recovery procedure, storage devices that come online (unbypassed) are not made visible to external hosts (e.g., computers 110 on the computer network 102. This is to avoid the external hosts seeing storage devices repeatedly alternating between being online and offline, which may be confusing to the external hosts. The online storage devices are made visible to the hosts after either completion of the recovery procedure, or after some predetermined threshold point is reached. The threshold point is considered to be the end of the recovery procedure (e.g., the threshold point can be a predetermined number of drive enclosures being processed).

Instructions of software described above (including the DDD recovery module 150 in FIG. 1) are loaded for execution on a processor (e.g., CPU(s) 152). The processor includes microprocessors, microcontrollers, processor modules or subsystems (including one or more microprocessors or microcontrollers), or other control or computing devices.

Data and instructions (of the software) are stored in respective storage devices (e.g., memory 154), which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
   detecting a failure condition caused during a discovery procedure associated with a plurality of storage devices on a storage network having at least one primary bus interconnecting the plurality of storage devices, wherein the discovery procedure includes initializing the at least one primary bus, detecting presence of the storage devices, and configuring the storage devices for use, and wherein detecting the failure condition comprises detecting a condition caused by disruption of completion of the discovery procedure; and
   in response to detecting the failure condition, interacting with the plurality of storage devices over a secondary bus separate from the primary bus to identify and disable one or more of the plurality of storage devices causing the failure condition, wherein interacting with the plurality of storage devices comprises:
   bypassing the plurality of storage devices on the at least one primary bus, wherein bypassing the plurality of storage devices causes the plurality of storage devices to be disconnected from the at least one primary bus;
   unbypassing in sequence the bypassed plurality of storage devices; and
   after each unbypassing of a bypassed storage device, evaluating whether the failure condition is present.

2. The method of claim 1, wherein the at least one primary bus includes plural primary buses that are separate from the secondary bus, wherein detecting the failure condition is performed by a storage controller, and wherein the storage controller interacts with the plurality of storage devices over the secondary bus, the method further comprising the storage controller performing read and write operations with the plurality of storage devices over the plural primary buses.

3. The method of claim 2, wherein performing the read and write operations with the plurality of storage devices over the plural primary buses comprises performing the read and write operations with the plurality of storage devices over plural Fibre Channel loops that are separate from the secondary bus.

4. The method of claim 1, wherein interacting with the plurality of storage devices over the secondary bus further comprises:

if after unbypassing of a particular one of the plurality of storage devices causes the failure condition to be present, identifying the particular storage device as causing the failure condition and disabling the particular storage device by removing the particular storage device from the at least one primary bus.

5. The method of claim 4, wherein the detecting and interacting acts are performed as part of a recovery procedure, and wherein interacting with the plurality of storage devices over the secondary bus further comprises:
after disabling the particular storage device by removing the particular storage device from the at least one primary bus, unbypassing remaining storage devices;
further evaluating whether the failure condition is present; and
if the failure condition is not present, exiting the recovery procedure.

6. The method of claim 1, wherein the plurality of storage devices are divided into groups arranged in respective storage device enclosures, and wherein interacting with the plurality of storage devices over the secondary bus comprises:
bypassing all storage device enclosures on the at least one primary bus;
unbypassing in sequence storage device enclosures;
after each unbypassing of a storage device enclosure, evaluating whether the failure condition is present; and
if after unbypassing of a particular one of the storage device enclosures causes the failure condition to be present, identifying the particular storage device enclosure as causing the failure condition.

7. A method comprising:
detecting a failure condition caused during discovery of storage devices on a storage network having at least one primary bus interconnecting the storage devices, wherein detecting the failure condition caused during discovery of the storage devices comprises detecting the failure condition during a discovery procedure associated with the storage devices, and wherein the discovery procedure includes initializing the at least one primary bus, detecting presence of the storage devices, and configuring the storage devices for use, and wherein detecting the failure condition comprises detecting a condition caused by disruption of completion of the discovery procedure; and
in response to detecting the failure condition, interacting with the storage devices over a secondary bus separate from the primary bus to identify and disable one or more of the storage devices causing the failure condition,
wherein the storage devices are divided into groups arranged in respective storage device enclosures, and wherein interacting with the storage devices over the secondary bus comprises:
bypassing all storage device enclosures on the at least one primary bus;
unbypassing in sequence the bypassed storage device enclosures;
after each unbypassing of a storage device enclosure, evaluating whether the failure condition is present;
if after unbypassing of a particular one of the storage device enclosures causes the failure condition to be present, identifying the particular storage device enclosure as causing the failure condition;
bypassing all storage devices in the particular storage device enclosure;
unbypassing in sequence storage devices in the particular storage device enclosure;
after each unbypassing of a storage device, evaluating whether the failure condition is present; and
if after unbypassing of a particular one of the storage devices in the particular storage device enclosure causes the failure condition to be present, identifying the particular storage device as causing the failure condition.

8. An article comprising at least one non-transitory storage medium containing instructions that when executed cause a processor to:
detect a failure condition caused during a discovery procedure associated with storage devices in storage enclosures on a storage network having at least one primary bus interconnecting the storage enclosures, wherein the discovery procedure includes initializing the at least one primary bus, detecting presence of the storage devices, and configuring the storage devices for use, and wherein detecting the failure condition comprises detecting a condition caused by disruption of completion of the discovery procedure; and
in response to detecting the failure condition, interact with the storage enclosures over a secondary bus separate from the at least one primary bus to identify and remove one or more of the storage devices causing the failure condition, wherein interacting with the storage enclosures over the secondary bus comprises:
identifying a particular one of the storage enclosures as being associated with the failure condition; and
identifying within the particular storage enclosure one or more storage devices causing the failure condition,
wherein identifying the particular one of the storage enclosures as being associated with the failure condition comprises:
bypassing the storage enclosures on the at least one primary bus;
after the bypassing, unbypassing in sequence the storage device enclosures;
after unbypassing the particular storage device enclosure, evaluating whether the failure condition is present, and if the failure condition is present, identifying the particular storage enclosure as causing the failure condition.

9. The article of claim 8, wherein the storage network has another primary bus interconnecting the storage enclosures, and wherein detecting the failure condition comprises detecting failure of both primary buses caused during discovery of the storage devices, and wherein the primary buses are separate from the secondary bus.

10. The article of claim 9, wherein the instructions when executed cause the controller to perform read and write operations with the storage devices over the primary buses.

11. The article of claim 10, wherein the instructions when executed cause the controller to detect heartbeat indications from the storage devices over the secondary bus.

12. The article of claim 9, wherein the primary buses comprise Fibre Channel arbitrated loops, and wherein detecting the failure condition comprises detecting failure of both Fibre Channel arbitrated loops due to at least one storage device disrupting discovery of the storage devices.

13. The article of claim 8, wherein identifying within the particular storage enclosure one or more storage devices causing the failure condition comprises:
bypassing storage devices in the particular storage enclosure;
after bypassing the storage devices, unbypassing in sequence the storage devices; and
after each unbypassing of a storage device, evaluating whether the failure condition is present.

14. The article of claim 13, wherein identifying within the particular storage enclosure one or more storage devices causing the failure condition further comprises:
- if after unbypassing of a particular one of the storage devices causes the failure condition to be present, identifying the particular storage device as causing the failure condition and disabling the particular storage device by removing the particular storage device from the at least one primary bus.

15. The article of claim 14, wherein the detecting and interacting acts are performed as part of a recovery procedure, and wherein interacting with the storage enclosures over the secondary bus further comprises:
- after disabling the particular storage device by removing the particular storage device from the at least one primary bus, unbypassing remaining storage devices;
- further evaluating whether the failure condition is present; and
- if the failure condition is not present, exiting the recovery procedure.

16. A storage controller for use in a storage network having plural storage devices, comprising:
- a processor; and
- a recovery module executable on the processor to:
  - detect a failure condition caused by disruption of completion of a discovery procedure to discover storage devices in storage enclosures coupled to at least one primary bus of the storage network, wherein the discovery procedure includes initializing the at least one primary bus, detecting presence of the storage devices, and configuring the storage devices for use; and
  - in response to detecting the failure condition, interact with the storage enclosures over a secondary bus separate from the at least one primary bus to identify and disable one or more of the storage devices that disrupted completion of the discovery procedure, wherein the recovery module interacts with the storage enclosures over the secondary bus by:
  - identifying a particular one of the storage enclosures as being associated with the failure condition; and
  - identifying within the particular storage enclosure one or more storage devices causing the failure condition,
  - wherein the particular one of the storage enclosures is identified as being associated with the failure condition by:
  - bypassing the storage enclosures on the at least one primary bus;
  - after the bypassing, unbypassing in sequence the storage device enclosures;
  - after unbypassing the particular storage device enclosure, evaluating whether the failure condition is present, and if the failure condition is present, identifying the particular storage enclosure as causing the failure condition.

17. The storage controller of claim 16, wherein the storage network comprises a Fibre Channel network.

18. The article of claim 16, wherein the one or more storage devices within the particular storage enclosure are identified as causing the failure condition by:
- bypassing storage devices in the particular storage enclosure;
- after bypassing the storage devices, unbypassing in sequence the storage devices;
- after each unbypassing of a storage device, evaluating whether the failure condition is present; and
- if after unbypassing of a particular one of the storage devices causes the failure condition to be present, identifying the particular storage device as causing the failure condition.

* * * * *